United States Patent [19]
Lemelson

[11] 3,716,445
[45] Feb. 13, 1973

[54] REFLEX REFLECTIVE SHEETING

[76] Inventor: Jerome H. Lemelson, 85 Rector Street, Metuchen, N.J. 08840

[22] Filed: June 24, 1970

[21] Appl. No.: 56,047

Related U.S. Application Data

[63] Continuation of Ser. No. 744,911, July 15, 1968, abandoned, which is a continuation-in-part of Ser. No. 489,654, Sept. 23, 1965, Pat. No. 3,396,637, which is a continuation-in-part of Ser. No. 360,954, June 11, 1953, Pat. No. 3,220,871.

[52] U.S. Cl. ............................ 161/2, 94/1.5, 117/35, 117/160, 161/4, 161/5, 161/6, 161/130, 161/131, 350/102, 350/288
[51] Int. Cl. .............................................. B44f 1/02
[58] Field of Search......161/2, 4, 6, 5, 130, 131, 138, 161/DIG. 3; 117/35 R, 35 S, 35 V, 106, 107, 160; 94/1.5; 350/102, 103, 106, 109, 288

[56] References Cited

UNITED STATES PATENTS

| | | | |
|---|---|---|---|
| 2,481,757 | 9/1949 | Jungerson | 350/103 |
| 2,676,518 | 4/1954 | Rupert | 350/103 |
| 2,501,563 | 3/1950 | Colbert et al | 117/107 |
| 2,270,944 | 5/1939 | Frick | 161/167 |
| 2,360,480 | 10/1944 | Dickson | 350/102 |
| 2,167,149 | 7/1939 | Grote | 40/135 |
| 3,155,764 | 11/1964 | Gill, Jr. | 161/4 X |
| 2,128,390 | 8/1938 | Zerilli | 350/106 |
| 2,882,413 | 4/1959 | Vingerhoets | 117/35 X |
| 1,786,958 | 12/1930 | Oestnaes | 350/103 |
| 2,875,087 | 2/1959 | Crandon | 117/35 X |
| 1,691,708 | 11/1928 | Egleson | 161/4 X |

FOREIGN PATENTS OR APPLICATIONS

| | | | |
|---|---|---|---|
| 1,020,520 | 11/1952 | France | 350/109 |

*Primary Examiner*—Daniel J. Fritsch
*Attorney*—Fred Philpitt, Esq.

[57] ABSTRACT

New and improved structures in reflective sheeting are provided which may be produced automatically and continuously of a single material in substantially long lengths and areas larger than heretofore possible. In one form, the material of which the reflective sheeting is made comprises a flexible transparent polymer which has one or more surfaces of which sheeting has been embossed in a manner to reflect incident light striking the sheet back to the vicinity of the source.

4 Claims, 9 Drawing Figures

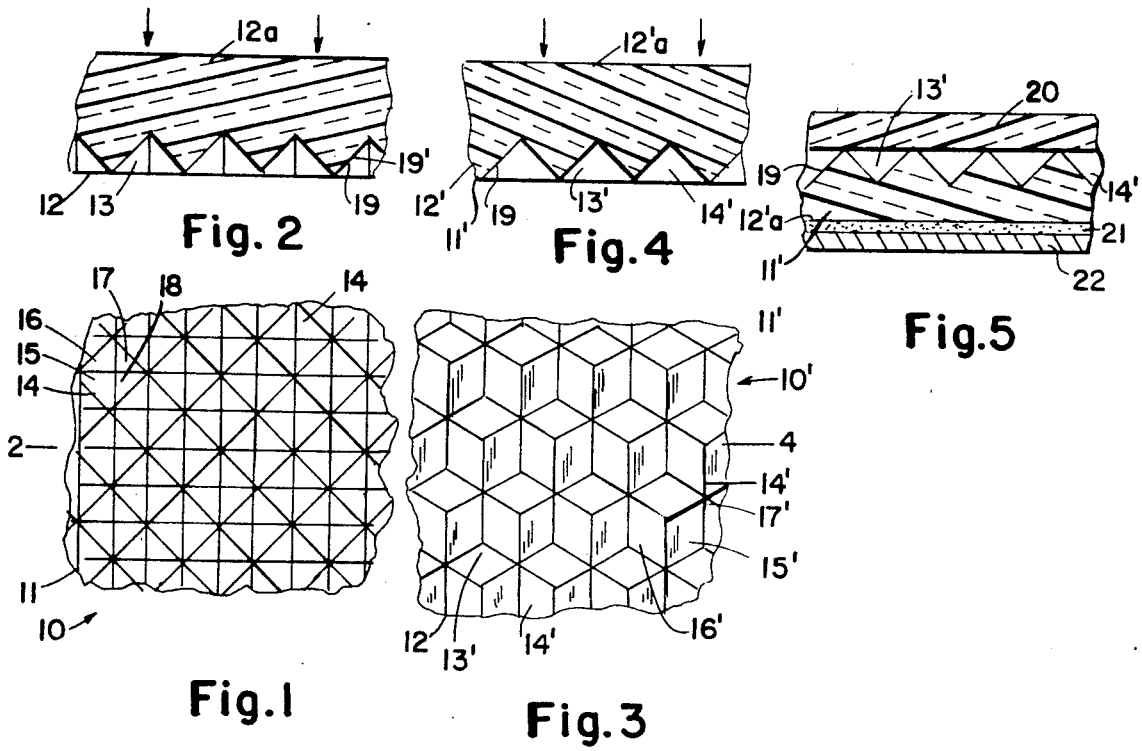
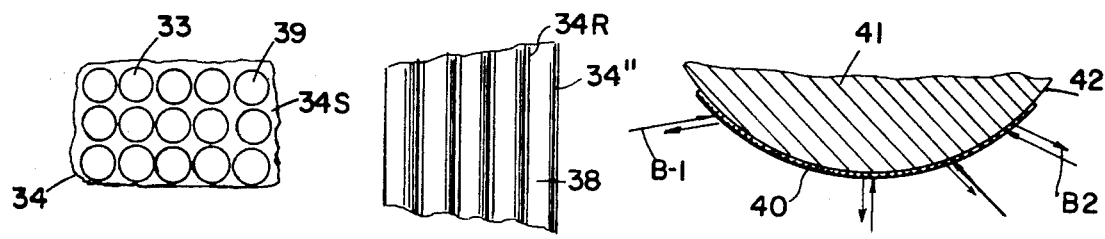
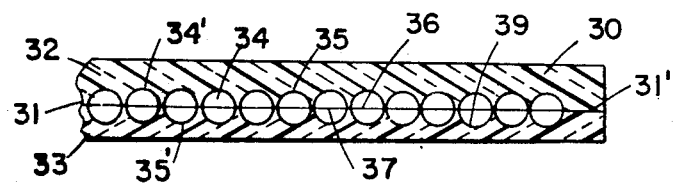
INVENTOR.
Jerome H. Lemelson

REFLEX REFLECTIVE SHEETING

RELATED APPLICATIONS

This is a continuation of copending application Ser. No. 744,911, filed July 15, 1968, now abandoned, which, in turn, is a continuation-in-part of copending application Ser. No. 489,654 filed Sept. 23, 1965 now U.S. Pat. No. 3,396,639, for Reflecting Devices and having as a parent application Ser. No. 360,954 filed June 11, 1953, now U.S. Pat. No. 3,220,871.

SUMMARY

This invention relates to new and improved reflex reflecting sheet materials capable of reflecting light directed thereagainst back to the source of said light. Heretofore, reflex reflective sheeting has comprised a substrate containing a multitude of small glass spherical beads embedded in a surface strata thereof. Such sheeting has been relatively costly to produce due to the complex manufacturing techniques involved in precisely forming glass spheres and properly providing said spheres secured to the substrate to effectively reflex reflect light. While such sheet has served useful purposes, its reflective efficiency is substantially less than the maximum attainable of a planar reflector due to light scattering and absorption in the beads, binder and reflective material disposed in said binder.

Accordingly it is a primary object of this invention to provide a new and improved structure in a retro-reflecting device provided in sheet from and capable of being produced in substantially larger areas than conventional molded retro-reflectors thereby greatly increasing the versatility and applications of the reflector.

Another object is to provide an improved reflex reflecting sheet structure which is substantially simpler in construction than conventional reflex reflecting sheet material employing glass beads.

Another object is to provide a reflex reflecting material in sheet form which may be made continuously by merely properly embossing a sheet of transparent plastic.

Another object is to provide a retro-reflecting device which is flexible and may be made to conform to the shape of a base or substrate on which it is mounted thereby increasing the versatility and improving the operation of the device.

Another object is to provide a reflex reflecting device in the form of a sheet having substantially greater reflecting efficiency than conventional reflex reflecting sheeting made in part of glass beads.

Another object is to provide an improved structure in a retro-reflecting material having a plurality of corner reflecting cavities formed by embossing a surface of a sheet and providing the corner reflecting surfaces highly reflective.

Another object is to provide improved structures in reflex or retro-reflecting materials having corner reflecting surface formations which are metallized, thereby reducing the need to provide highly polished reflecting surfaces.

Another object is to provide an improved method and apparatus for continuously producing reflex reflecting sheet material automatically in areas large enough to be used as complete highway signs.

With the above and such other objects as may hereinafter more fully appear, the invention consists of the novel constructions, combinations and arrangements of parts which will hereinafter be more fully described and illustrated in the accompanying drawings, wherein are shown embodiments of the invention but it is to understood that changes, variations and modifications may be resorted to which fall within the scope of the invention as claimed.

In the drawings:

FIG. 1 is a face view of a fragment of one form of retro-reflecting sheet material made in accordance with the teachings of the instant invention;

FIG. 2 is a side view in cross section of the material of FIG. 1;

FIG. 3 is a face view of a fragment of another form of retro-reflective sheet material also made in accordance with the teachings of the invention;

FIG. 4 is a cross sectioned side view of FIG. 3;

FIG. 5 is a cross sectioned side view of a modified form of the invention;

FIG. 6 is a side cross sectional view of a portion of a reflex reflecting sheet material fabricated of two embossed sheets laminated together to provide a plurality of cavities within the lamination having wall formations adapted to reflex reflect light directed against one of the major surfaces of the sheet;

FIG. 7 is a plan view of one form of the sheet of FIG. 6 shown as a fragment thereof;

FIG. 8 is a plan view of a fragment of another form of the sheet of FIG. 6 and

FIG. 9 is an end view in cross section of the sheet materials defined in FIG. 1 to 8 applied to a curved base or substrate and conforming to the surface thereof to provide a new type of reflecting device.

There is shown in FIGS. 1 and 2 a structure 10 in a reflecting material formed of a single sheet 11 of transparent plastic which sheet is so shaped and finished as to be capable of reflex or retro reflecting light beamed against either or both its major surfaces back in the direction of the source of said light with little loss in intensity and over a substantial angle of incidence or incliniation of the incident light to said major surface. Embossed in one surface 12 of the sheet 11 are a multitude of closely spaced indentations or cavities 13 having, in FIGS. 1 and 2, pyramidal shaped walls defined by notations 15, 16, 17 and 18 which define one of said cavities. The surfaces of the cavity walls 15–18 are highly reflective derived either as the result of employing an embossing roll with highly polished embossing or forming surfaces on the protrusions of said roll which form the cavities 13 in the sheet 11 or by depositing a thin, highly reflective film 19 such as a metallized coating of metal such as aluminum applied continuously to the surface of the sheet 11 containing the cavities 13 as said sheet is fed from the embossing means. Notation 19' refers to a thin film of clear plastic coating the metallized film 19 deposited on the surfaces 15 to 18 of each cavity 13.

Light beamed against the surface 12a of the sheet 11 over a range of incident angles equivalent to at least 90° or 45° either side of the normal to the surface 12a will be reflex reflected or retro-directed back in the direction of the incident light after reflecting off a plurality of the surfaces 15 to 18 which are disposed at 90° to each other. It is seen in FIG. 1 that the indentations or cavities 13 each have a substantially square border at the surface 12 and the border or rim of each cavity substantially defines respective legs of the borders or rims of four cavities adjacent thereto.

Sheet 11 may be made of a number of light transmitting, transparent polymers including such resins as flexible polyester, polyvinyl chloride, polyvinyl fluoride, polyamide, ionomer, acetate or other resins having high clarity and capable of either being embossed in a manner to define highly polished and reflective surfaces or capable of being metallized to provide a highly reflective surface. For sheet material applicable for use as a highway sign, delineator or reflective material for vehicles, sheet 11 is preferably in the range of 0.002 to 0.050 inch thick depending on the particular application and requirements while the cavity formations 13 preferably vary from 0.0005 to 0.025 inch in depth and along a side thereof at the surface 12 of the sheet. In the form of the invention shown in FIGS. 1 and 2, the border portions 14 of each cavity define narrow ridges at the surface 12 of the sheet perhaps 1 to 2 mills thick or less.

In FIGS. 3 and 4 is shown a modified form of the invention in which a sheet 11' of reflecting material 10' is emboss-formed with a multitude of cavities 13' in a major surface 12' of said sheet each cavity being defined by three rectangular parallepiped shaped planar surfaces defined by notations 15',16' and 17', said surfaces being disposed at right angles to each other so as to reflect light rays directed towards or entering each cavity 13' from a plurality of said surfaces which cooperate to retro-direct or reflex reflect said light rays back in the direction of the source or along the angle of incidence. Here again, the surfaces of the walls 15',16' and 17' of the cavities 13' may be highly reflective by virtue of their being extremely smooth finished or a coating 19 of metal applied thereto by plating or metallizing may be provided on said surfaces to effect retroreflection of said light from either major surface of the sheet 11'.

In FIG. 5 is shown a modified form of the reflecting device 10' of FIGS. 3 and 4, the features of which may also be applied to the device of FIGS. 1 and 2 without departing from the invention. The flat rear face 12a of the reflective sheet 11' is coated with a pressure sensitive adhesive 21 against the outer surface of which is provided a flexible backing sheet 22 serving as a protection for the adhesive and a release sheet. The sheet 22 is preferably made of a silicone coated or treated paper so that it will easily peel off the adhesive when the user is ready to apply the reflective sheeting 10' to a surface such as a sign board. Disposed against the face 12' of sheet 11' and preferably sealed thereto is a sheet 20 of transparent flexible plastic such as one of the polymers described above which sheet serves to protect the face 20' of the sheet 11' from abrasion and to prevent dust and moisture from entering the cavities 13' thereof. Thus if a metallized coating 19 is disposed against the surfaces 15' to 17' of the cavity walls of cavities 13', it need not be overcoated with a coating of transparent plastic since adequate protection thereof may be afforded by the capping sheet 20.

The structure shown in FIG. 5 may also be modified to include material of the capping layer 20 in the cavities 13' so as to completely fill said cavities with the metallized coating 19 disposed either on the surfaces of the walls 15',16' and 17' of said cavities 13' in the sheet 11' or on the surfaces of those portions of the capping material 20 abutting the surfaces 15' to 17'. The surface 12'a of sheet 11' may also be utilized as the front face of the reflective device whereupon the coating 21 of adhesive would either be eliminated or would be disposed on the outer face of the capping layer 20'.

Yet another structure in a retro-reflector of the type described may be had whereby the metallic coating 19, a metallized layer several millionths of an inch thick, may be completely eliminated by filling the cavities 13 or 13' with a resin having an index of refraction which is substantially different, higher or lower, than the index of refraction of the resin or material comprising the base sheet 11 or 11' so as to delineate or define the interfacial surfaces of the cavity walls sufficiently to effect reflex reflection.

In FIG. 6 is shown reflex reflector 30 comprising a sheet 31 of transparent material comprising a polymer as described and made of two sheets 32 and 33 which are bonded or welded together after embossing respective surfaces of said sheets with a plurality of closely spaced indentations 35 and 35', which when the two sheets are properly aligned and joined as shown in FIG. 6 define a plurality of cavities 34 which are totally enclosed within the sheet 31. The cavities 34 may be of spherical or cylindrical shape and are formed with highly reflecting surfaces 34' which serve to refract and reflect light directed against either or both the major surfaces 36 and 37 of the sheet 31 back in the direction of the incident light. In other words, spherical reflective surface formations defined by cavities 34 act in the manner of small spherical glass beads to focus light at or near the spherical surface which reflects and redirects said light thereafter back through the cavity and then the sheet material in the direction of the source. Cylindrical cavity formations 38 shown in FIG. 8 comprising cavities 34'' serve to focus light in lines or bands at or near the rear surfaces of the cylinders which reflects the band light back through the cavity and then the sheet in the direction of incident light.

Notation 39 refers to a metallized coating which has been vacuum deposited against the surfaces of the cavities of only one (33) of the original sheets thereby making said semi-spherical or semi-cylindrical surfaces highly reflex reflective to light passing through the portion of sheet 31 made from sheet 32 and the non-coated cavity walls thereof.

In FIG. 6 notation 31' refers to the border portions of the two sheets 32 and 33 which are sealed or welded together to hermetically seal the cavities 34 formed of the two sheets. The spaces 34S between adjacent cavities shown in FIG. 7 may also be sealed together.

The reflective sheet material 30 of FIGS. 6 to 8 may be fabricated in one manner, by continuously feeding the two sheets 32 and 33 or continuously forming same by extrusion of suitable resins such as described above and feeding both sheets simultaneously to respective embossing roll pairs operative to provide either the semi-spherical or semi-cylindrical cavities or channel formations in respective surfaces of the sheets and bringing said embossed surfaces together on a continuous basis as fed from the respective embossing means with the embossed cavities of each sheet aligned with those of the other sheet upon abutment of the two sheets. The two sheets may be heat sealed together by passing same between welding dies in the form of power rotated rolls compressing cavities together and suitably energized by radio frequency heat sealing energy to electronically weld the surfaces 34S between the cavities in both surfaces of the two abutting sheets defining single reflecting units as described. One of the two sheets may be premetallized or may be metallized as described between the embossing operation and the welding operation. If the sheets are formed with semi-cylindrical cavities 34'', ridge or band-like formations 34R may be provided between adjacent parallel cavities or channels which formations may be electronically welded together as described.

In FIG. 9 is shown a sheet 40 of reflex reflecting material of the type defined in the other drawings secured to the convex surface 42 of a curved substrate or base 41. While a flat member made of corner reflecting members or cavities will retro-reflect light directed thereagainst over an incident angle range of about 90°, it is easily seen that of the flexible retro-reflecting sheet material 40 of the instant invention is made to conform to a curved surface 42 the angle over which incident light will be reflected back to the vicinity of the source will be greatly increased thus greatly enhancing the efficiency of the reflector.

Notations B1 and B2 of FIG. 9 refer to light rays striking the reflective sheet 40 and retro-reflecting at almost 180° due to curvature. If the sheet 40 is relatively thin and made of a flexible plastic, as described, such as a polyvinyl chloride, ionomer or a clear silicone resin or a rigid plastic such as cellulose acetate butyrate, rigid vinyl, methyl methacrylate, polyamide, polyester or the like which is capable of flexure in the thickness prescribed herein, it may be made to conform to such articles as posts or telephone poles, curbing, vehicle bumpers and bodies and other convex or concave surfaces and fastened thereto by means of adhesive, fasteners or clamping means to render the support or substrate highly light reflective over a large area thereof if necessary. Because of the high reflection of the corner reflecting cavities provided as described in the sheeting and the fact that larger than usual areas of reflecting material may be applied when made in accordance with the teaching of the instant invention and, furthermore, the fact the reflective sheeting is flexible and may be bowed or otherwise made to conform to curved irregularly shaped surfaces, the versatility and efficiency of this type of retroreflector is greatly increased.

In the embodiment of the invention shown in FIG. 5 or modifications thereof employing a plastic filling the corner-reflecting cavities 13', the outer surface 20' of the capping or filling layer 20, which faces the direction of incident light and the oncoming vehicle approaching the reflector or sign, may contain transparent or opaque indicia printed, silk screened or otherwise applied thereon and operative to break up the reflected light into patterns or provide images of different colors across the face of the reflective sheeting such as lettering or advertising indicia. The notation A in FIGS. 2, 4 and 5 refers to such indicia which is printed or otherwise applied to the outer surfaces of the respective reflecting sheet materials.

In another form of the invention not shown in the drawings, it is noted that retroreflecting cavity formations such as the corner reflecting cavities 13 and 13' of FIGS. 1 and 3 may be may be of different size and shape in a single sheet to provide either varying reflecting effects or to increase the range of angles or angle over which incident light may be directed against the sheet and be retro-reflected back to the source. In other words, certain of the cavities may be inclined in one direction, others in a second direction and still others in a third and fourth directions.

Conventional embossing of glass or plastic materials involves providing said materials in a semi-molten or soft condition or the surface stratum thereof to be embossed in said condition and passing said sheet of semi-molten plastic between at least two rolls, one of which is an embossing roll having its peripheral surface shaped to provide the desired embossed formations in the surface of the sheet. After the embossing roll has made brief contact with one surface of the sheet, the sheet is removed therefrom onto a powered conveyor, carried away from the embossing roll and allowed to solidify whereby little if any control of shrinkage is effected. It is thus not possible to produce reflective sheet materials of the types hereinabove described due to the fact that the described reflective surfaces of the cavity formations are not precisely enough formed.

Forming part of the instant invention is an embossing apparatus (not shown) employing a cylindrical embossing roll or drum of substantial diameter and means for feeding a sheet of material such as a suitable polymer as described to the surface of the embossing roll and deforming the surface of said sheet with cavity formations as described while maintaining said sheet in abutment with the surface of the drum for a substantial portion of its rotation such that the sheet or the surface stratum thereof containing the cavity formations has an opportunity to cool or set with minimum warpage or shrinkage. Maintainance of said sheet against the surface of the embossing roll or drum for a substantial portion of the travel thereof, preferably in excess of 180° of its travel, may be effected by means of a conveyor belt such as a sheet of stainless steel or other material which is power driven in an endless path which includes travel of the belt against the sheet abutting the drum thereby compressing said sheet against the surface of the drum and maintaining it thereagainst for a substantially portion of the rotation of the drum. In a second machine arrangement, the thin plastic sheet to be embossed is bonded to a substrate which substrate is guided and drawn or forced against the surface of the embossing drum to force the plastic to be embossed against said surface, by driving said substrate sheet between a plurality of powered rollers and said powered embossing roll or drum.

While said sheet is maintained against the embossing roll or drum, portions of said drum or the conveyor belt engaging the sheet thereagainst which are downstream of the entery portion for the sheet are cooled by directing coolant fluid against the inside of the drum, the outside of the conveyor belt maintaining the sheet against the drum or the sheet itself so as to thereby control shrinkage and solidification or setting of the material of the sheet. Thus the material of the sheet being embossed may be dimensionally controlled to the desired degree and the cavities formed therein to a requisite tolerance as said material is maintained under pressure while solidifying or setting.

I claim:

1. A reflex reflecting device, comprising; a pair of transparent layers disposed one against the other, the facing surfaces of each of said layers having a multitude of cavities embossed therein, said cavities being closely spaced and having wall formations of irregular shape which are highly reflective to light, one of said layers including at least one cavity aligned with each of the cavities of the other layer to define a plurality of totally enclosed cavities, the surfaces of said totally enclosed cavities being highly reflective and shaped to focus light directed against the composited layers within said totally enclosed cavities and to reflex reflect the light back in the incident direction.

2. A device in accordance with claim 1 wherein said totally enclosed cavities are spherical in shape.

3. A device in accordance with claim 1 wherein said totally enclosed cavities are cylindrical in shape.

4. A device in accordance with claim 1 wherein at least half of the wall area of said totally enclosed cavities defined by one of said layers is metallized giving it a metallic reflective surface.

* * * * *